(12) United States Patent
Ziauddin et al.

(10) Patent No.: US 11,334,567 B2
(45) Date of Patent: May 17, 2022

(54) EFFICIENT SQL-BASED GRAPH RANDOM WALK

(71) Applicant: Oracle International Corporation, Redwood Shores, CA (US)

(72) Inventors: Mohamed Ziauddin, Pleasanton, CA (US); Zhe Wu, Mountain View, CA (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 291 days.

(21) Appl. No.: 16/543,258

(22) Filed: Aug. 16, 2019

(65) Prior Publication Data

US 2021/0049171 A1   Feb. 18, 2021

(51) Int. Cl.
  *G06F 16/2453*    (2019.01)
  *G06F 16/901*     (2019.01)

(52) U.S. Cl.
  CPC .... *G06F 16/24535* (2019.01); *G06F 16/9024* (2019.01)

(58) Field of Classification Search
  CPC .......... G06F 16/24535; G06F 16/9024; G06F 16/2458
  See application file for complete search history.

(56) References Cited

U.S. PATENT DOCUMENTS

| 2006/0122998 | A1* | 6/2006 | Bar-Yossef | ........... G06F 16/951 |
| 2020/0192957 | A1* | 6/2020 | Augustine | ............... G06F 16/27 |

* cited by examiner

*Primary Examiner* — Grace Park
(74) *Attorney, Agent, or Firm* — Invoke

(57) ABSTRACT

Embodiments generate random walks through a directed graph that is represented in a relational database table. Each row of the graph table represents a directed edge in the graph and includes a source vertex and a destination vertex. Each row is further augmented to (a) indicate the number of outbound edges starting from the destination vertex in the row and (b) include an identifier that distinguishes the edge from other outbound edges starting from the same source vertex. An SQL query may be executed on the augmented graph table. Starting from a source vertex (starting vertex or the destination vertex of the previously selected hop) the query randomly selects a row of the graph table representing one of the outbound edges from the source vertex and adds the selected outbound edge as a row in a random walk table that represents the next hop in the random walk.

24 Claims, 8 Drawing Sheets

| ROWNU | SVID | DVID | DVID_RANK | DVID_OUTDEG |
|---|---|---|---|---|
| 1 | 1 | 2 | 1 | 2 |
| 2 | 1 | 3 | 2 | 4 |
| 3 | 1 | 4 | 3 | 2 |
| 4 | 2 | 5 | 1 | 3 |
| 5 | 2 | 3 | 2 | 4 |
| 6 | 3 | 1 | 1 | 3 |
| 7 | 3 | 2 | 2 | 2 |
| 8 | 3 | 5 | 3 | 3 |
| 9 | 3 | 4 | 4 | 2 |
| 10 | 4 | 1 | 1 | 3 |
| 11 | 4 | 5 | 2 | 3 |
| 12 | 5 | 1 | 1 | 3 |
| 13 | 5 | 2 | 2 | 2 |
| 14 | 5 | 3 | 3 | 4 |

Augmented Graph Table (GRAPH_AUG)

605 → WITH RW (PATH, LENGTH, SVID, DVID, DVID_OUTDEG, DVID_RANK, NEXT) AS
608 → (SELECT ROWNUM, 1, SVID, DVID, DVID_OUTDEG, DVID_RANK,
611 →     TRUNC(DBMS_RANDOM.VALUE(1, DVID_OUTDEG + 1))
614 → FROM GRAPH_AUG WHERE SVID = 5 AND DVID_RANK = 1

UNION ALL

617 → SELECT PATH, LENGTH + 1, RW.DVID, G.DVID, G.DVID_OUTDEG, G.DVID_RANK,
620 →     TRUNC(DBMS_RANDOM.VALUE(1, G.DVID_OUTDEG + 1))
623 → FROM RW, GRAPH_AUG G
626 → WHERE RW.DVID = DECODE(G.DVID_RANK, NEXT, G.SVID, NULL) AND
        LENGTH < 10
     )
629 → SELECT PATH, LISTAGG(SVID, '->') WITHIN GROUP (ORDER BY LENGTH)
       RANDOM_PATH_DETAIL, MAX(LENGTH) LENGTH   FROM RW
632 → GROUP BY PATH;

FIGURE 6C

EFFICIENT SQL-BASED GRAPH RANDOM WALK

TECHNICAL FIELD

The present disclosure relates to generating a random walk on a graph. Specifically, recursive SQL is used to generate random walks through a graph that is stored in a relational database.

BACKGROUND

A graph may include a set of vertices and edges connecting vertices. The graph may represent relationships among a set of entities. An entity may be represented by a vertex, and a relationship between two entities may be represented by an edge connecting a pair of vertices. A random walk on a graph may be created by selecting a starting vertex, selecting an edge connecting the selected vertex to another vertex, and repeating this process until a termination criterion is met. A termination criterion may be that a maximum number of edges (hops) have been added to the random walk.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6C illustrates example SQL for generating a random walk table representing one or more random walks through a graph, in accordance with one or more embodiments;

Figure 1:
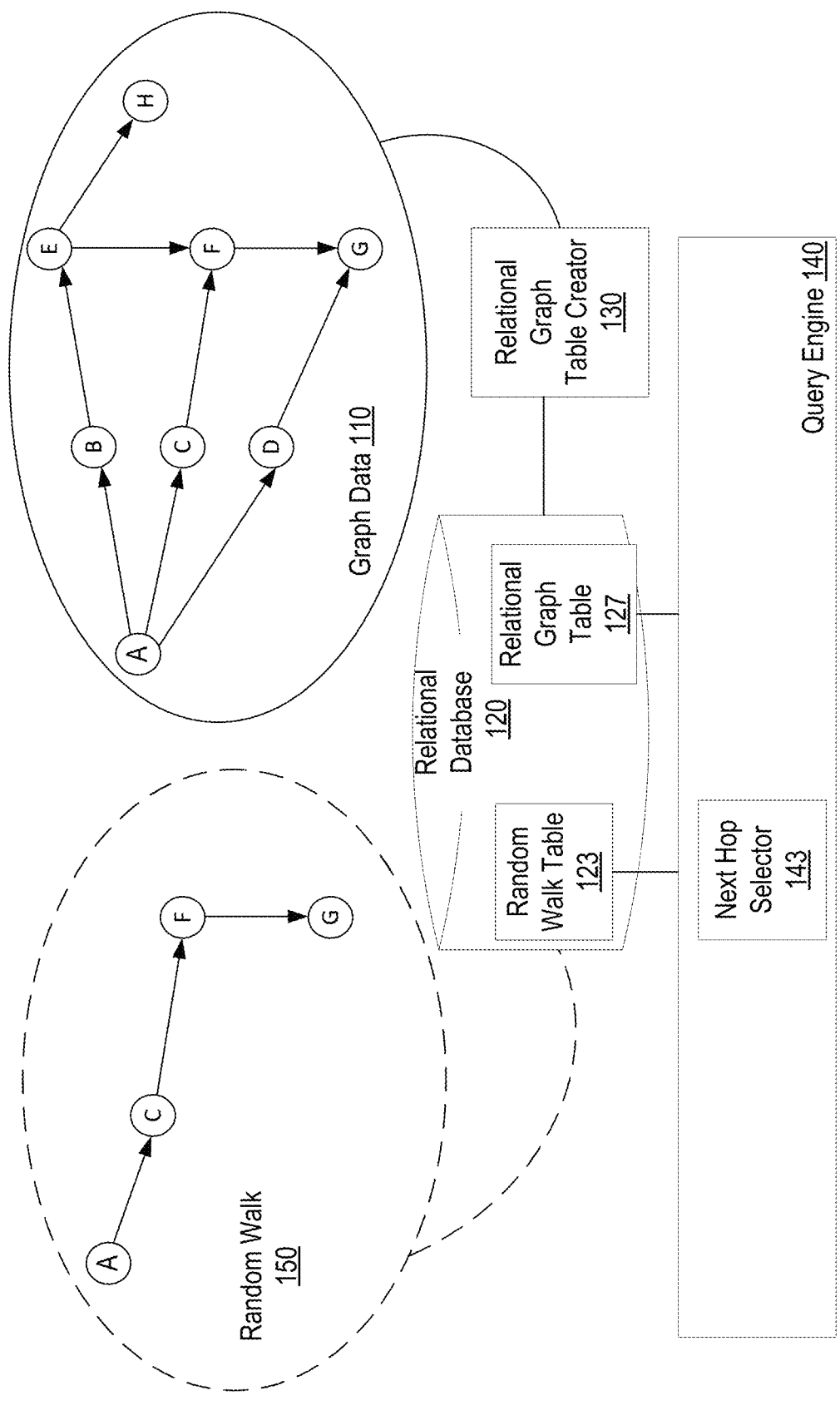
FIG. 1 is a block diagram that illustrates components of a random walk generator using a relational database, in accordance with one or more embodiments.

Components and operations illustrated in the figures may be added, removed, modified, or combined. Functionality described in relation to one component/operation may instead be implemented by another component/operation. Accordingly, the specific components/operations illustrated and/or described herein should not be construed as limiting the scope of any of the claims.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. INTRODUCTION

A graph data model includes vertices and edges. The vertices represent entities such as, for example, a person or an account. The edges encode relationships such as, for example, friendships between entities, a purchase by an entity, and a like by an entity. A random walk through a graph can start from a pre-selected vertex or a vertex that is randomly selected. From the starting vertex, the random walk may follow a randomly-selected outgoing edge from the starting vertex to the destination vertex of the edge. The next hop in the random walk starts from the destination vertex of the first hop and may traverse a randomly-selected edge outgoing from the destination vertex. This process may repeat until a termination criterion is met. For example, termination may occur when a vertex is selected that has no outgoing edges. For another example, the random walk may terminate when a maximum number of hops has been added to the walk.

Random walks may be very useful for analyzing complex relationships within a large graph. For example, page ranking and graph vertex embedding can be performed based on random walks. A random walk may include a representative sample of a larger graph. For example, a graph's vertices may represent words, and directed edges may represent an ordering of words in a natural language sentence. A random walk through such a graph may correspond to a randomly selected natural language sentence. Results from analysis on the representative sample may provide insight into relationships within the larger graph. The representative set of sentences can be fed into a deep learning neural network to compute a low-dimensional vector for each vertex in the graph. More applications of random walks may be found in Aldous, D. APPLICATIONS OF RANDOM WALKS ON FINITE GRAPHS, University of California Berkeley, 1991, which is included in Appendix A.

Other implementations of random walks are based on a graph represented using in-memory linked lists and implemented by following links/pointers. In contrast, embodiments disclosed herein store a graph representation in a relational database and use an SQL-based implementation to generate a random walk. Several key benefits of using an SQL-based graph random walk may include scalability in the size of the graph (the graph size need not be constrained by the size of memory), and the relational database may be used as a common platform for integrating with other graph processing engines without having to import and export graph data.

2. GENERAL OVERVIEW

Embodiments generate one or more random walks through a directed graph that is represented in a relational database table. Each directed edge of the graph is represented by a row in a graph table. In addition to a source vertex and a destination vertex, each row of the graph table is further augmented to indicate the number of outbound edges starting from the destination vertex in the row, such as the example augmented graph table illustrated in FIG. 5B of the example graph illustrated in FIG. 5A. In addition, each row is augmented with an identifier that distinguishes the edge from other outbound edges starting from the same source vertex. SQL statements may be executed on the augmented graph table. The SQL statements select a row in the graph table representing a next hop in the random walk. The SQL statements may select the graph table row by generating a random number that is mapped to one of the outbound edges starting from the destination vertex of the previous hop. As each hop is selected, a row representing the hop in a random walk is added to a random walk table. The rows of the random walk table define the random walk.

Some embodiments described in this Specification and/or recited in the claims may not be included in this General Overview section.

3. RANDOM WALK GENERATION ARCHITECTURE

FIG. 1 is a block diagram that illustrates components of a random walk generator using a relational database, in accordance with one or more embodiments. The main components are Relational Database 120 and Query Engine 140.

Relational Database 120 stores Relational Graph Table 127 and Random Walk Table 123. Relational Graph Table 127 stores a representation of a directed graph. Each row of relational graph table 127 may store one directed edge between a starting (source) vertex and a destination vertex. The relational graph table may store additional information in each row to facilitate using a recursive SQL query on the graph table. For example, a row representing an edge having a particular destination vertex may also include the number of outbound edges from the destination vertex. Each row may also include a number that is unique across all rows that represent outbound edges from the same source vertex. For example, if there are 3 outbound edges from a particular source vertex, then the three rows representing the three outbound edges may each be assigned a different identifier. In an embodiment, the identifiers may be consecutive numbers each with an equal probability of being selected during random walk. In an embodiment, the consecutive numbers may start at 0 or 1.

Relational Graph Table Creator 130 is a utility that converts a representation of a graph into a relational graph table 127. The input graph may be represented in any way and need not be stored in a relational database. In an embodiment, the graph data may be stored in memory and may represent vertices as in-memory data structures and directed edges as pointers. In another embodiment, the graph may be stored as a portion of a larger relational database that includes additional information that is not relevant to generating a random walk. For example, the graph data may include a vertex table that includes for each vertex information about the entity represented by the vertex. Such a vertex table may not be needed for generating a random walk, and thus, relational graph table creator 130 may copy only the necessary data into the graph table to improve algorithm efficiency.

Graph data 110 is an example of a graph representation that may exist outside of the relational database that relational graph table creator 130 may translate into rows of a relational graph table. For example, vertex A is a source vertex having 3 outbound directed edges to each of vertices B, C, and D. Each of edges A->B, A->C, and A->D may be represented as distinct rows in the relational graph table, each having a different identifier associated with the edge/row. The example graph represented by graph data 110 may be stored as 9 rows in the relational graph table, one row for each directed edge.

Random walk table 123 is a table created by executing one or more SQL statements on the relational graph table. Random walk table 123 may be a virtual table. The random walk table stores one or more random walks. Each row in random walk table 123 represents one hop of one random walk. Each row may include the source and destination vertices of the hop, as well as a random walk identifier. In an embodiment, the rows may be ordered to reflect the ordering of hops, and all rows representing hops in the same random walk may be together in the table (that is, not interleaved). In such an embodiment, the destination vertex of one row may be the source vertex of the next row. The hop represented by the next row may be traversed after the hop in the preceding row. In another embodiment, there may be further data stored in each row for efficiency and flexibility of the algorithm. For example, each row may store a row identifier. In an embodiment, rather than requiring the rows of the table to be ordered according to the ordering of the hops, a row in the table may include the row identifier of the next hop through the particular random walk. Other data that might be stored in a row includes the number of outbound edges from the destination vertex that may facilitate recursion of the algorithm.

Random Walk Data 150 is a single random walk stored in random walk table 123. The example random walk shown in random walk data 150 is a particular path through the graph represented by graph data 110. This random walk starts at vertex A and visits vertices F, G, in order. Vertex G has no outbound edges, which may be a termination criterion. The example random walk has 3 hops, and so the corresponding random walk table would include 3 rows.

Query Engine 140 executes one or more SQL statements that read rows from graph table 127 and write rows of random walk table 123. Next hop selector 143 is a portion of the SQL statements that determine the next hop of a random walk. There are several key benefits of using an SQL-based approach to generate a random walk: 1) this approach scales with the underlying SQL database; that is, the size of the graph is not bound by physical memory capacity, 2) graph data can sit in the SQL database without having to be read into a separate graph processing engine, and 3) the computed walks are the result of relational queries, so random walks may be easily integrated with other data types (relational, JSON, XML, etc.) supported by the same SQL database. With a SQL-based graph random walk algorithm and implementation, one can handle very large-scale graph data without a requirement of storing the complete graph in memory, as most dedicated graph engines do. There is also no need to bring graph data outside the database, which avoids difficult data synchronization problems. Such an algorithm and implementation adds a significant value to a SQL database, and in return extends the usual benefits of SQL database to graph processing and modeling such as security (e.g. encryption), compression, high availability (e.g. redundancy, failover), concurrency (e.g. multi-user accesses and updates), and scalability.

4. OPERATION OF RANDOM WALK GENERATOR

Different policies may determine the way in which one or more random walks are generated. For example, one policy may generate a single random walk from a user-selected or randomly-selected starting vertex. A policy may generate multiple random walks starting from a set of user-selected vertices or a set of randomly-selected vertices. A policy may define a maximum length for a random walk, such that during the generation of a random walk, when the number of hops reaches the maximum length (i.e., the maximum number of hops), the random walk generation terminates, and no further hops are added. A policy may dictate that random walk generation terminates when the source vertex of the next hop has no outbound edges. A policy may dictate that when the source vertex of the next hop has no outbound edges, the next hop added may be to a default next vertex such as the original starting vertex or the source vertex of the last hop (even though this default hop may not correspond to an edge in the graph).

In an embodiment in which a recursive algorithm is used, generating a random walk may include a two-step recursive process (a) creating a first hop and then (b) generating a sub-random walk starting from the destination vertex of the first hop. For example:

Random walk=first hop+first sub random walk

First sub random walk=second hop+second sub random walk

Second sub random walk=third hop+third sub random walk

When completed, the random walk includes a sequence of hops comprising: the first hop, the second hop, the third hop, etc. In an embodiment, adding hops to each random walk may be done recursively. When multiple random walks are generated, an entire random walk may be determined before starting the generation of another random walk. A recursive algorithm may generate all of the hops for one random walk before adding hops to a different random walk, causing the hops for a particular random walk to occupy contiguous rows of the random walk table. Alternatively, the algorithm may generate one hop for each of multiple random walks before adding a next hop to each of them.

In an embodiment, generating multiple random walks may be performed concurrently using multiple work processes and a manager that manages the random walk table. The random walk table may be initialized with the first hop of each random walk to be generated. The manager may maintain a pointer into the random walk table that indicates the next row to process, and the pointer may be initialized to point to the first row. When a worker process is ready for a new task, the manager may provide the worker process with the contents of the next row of the table as indicated by the pointer and increment the pointer to the next row. The worker process determines a next hop in which the source vertex of the next hop is the destination vertex in the row of table provided by the manager. When the worker thread is finished determining the next hop, a new row may be added to the end of the random walk table representing the new hop.

Figure 2:
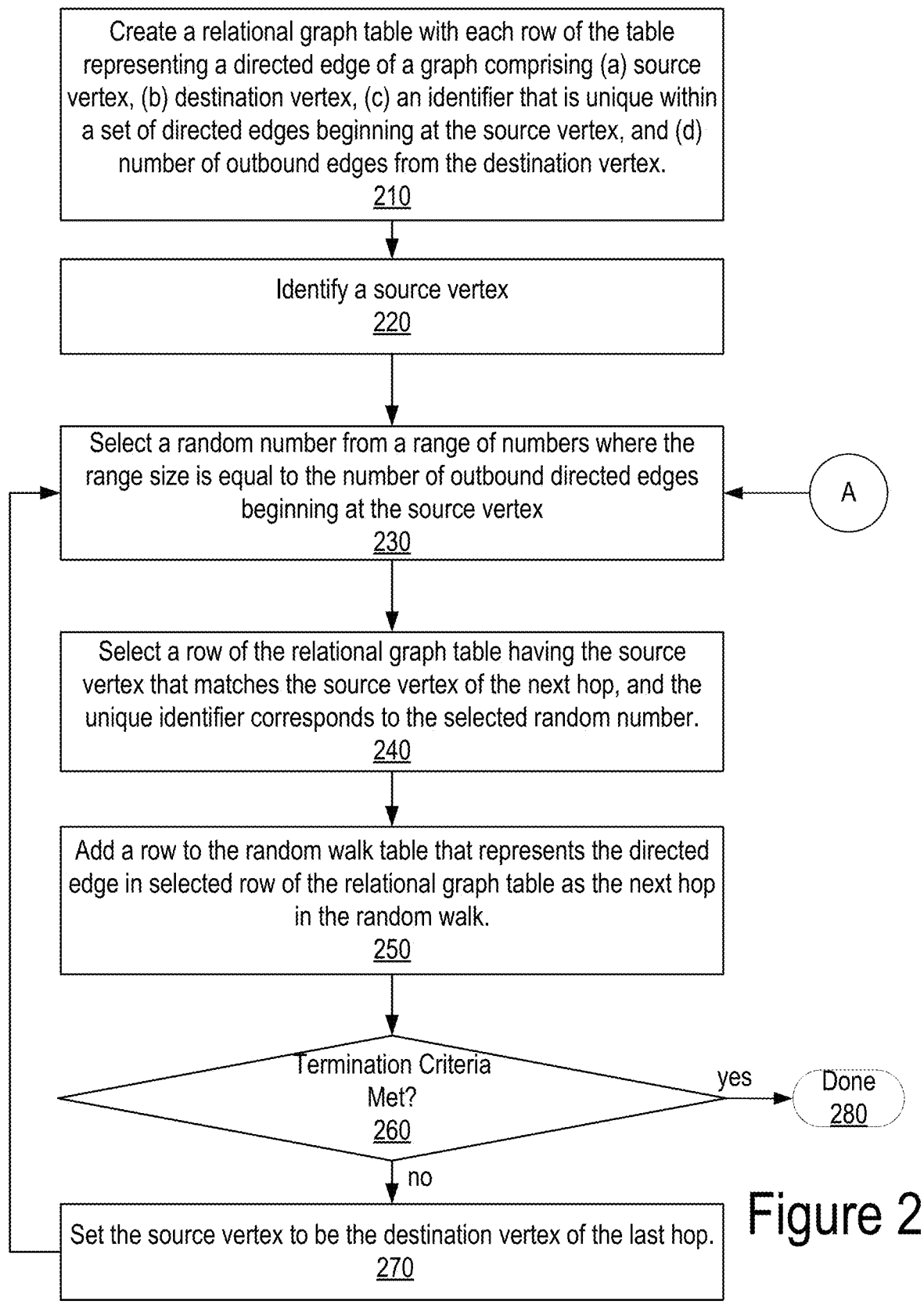
FIGS. 2, 3, and 4 are flow diagrams that illustrate generating one or more random walks through a graph stored in a relational database, in accordance with one or more embodiments.
Figure 3:
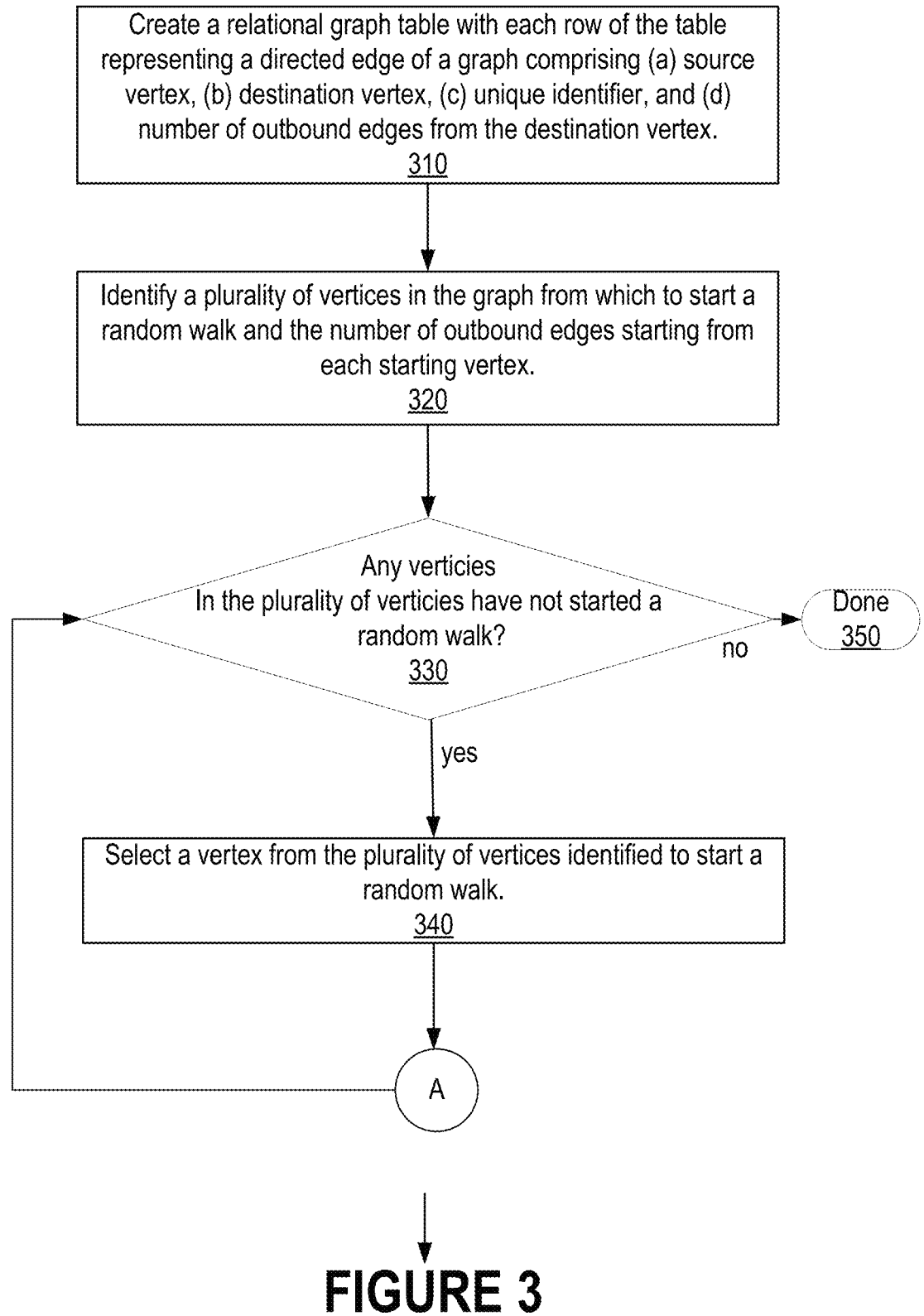
Figure 4:
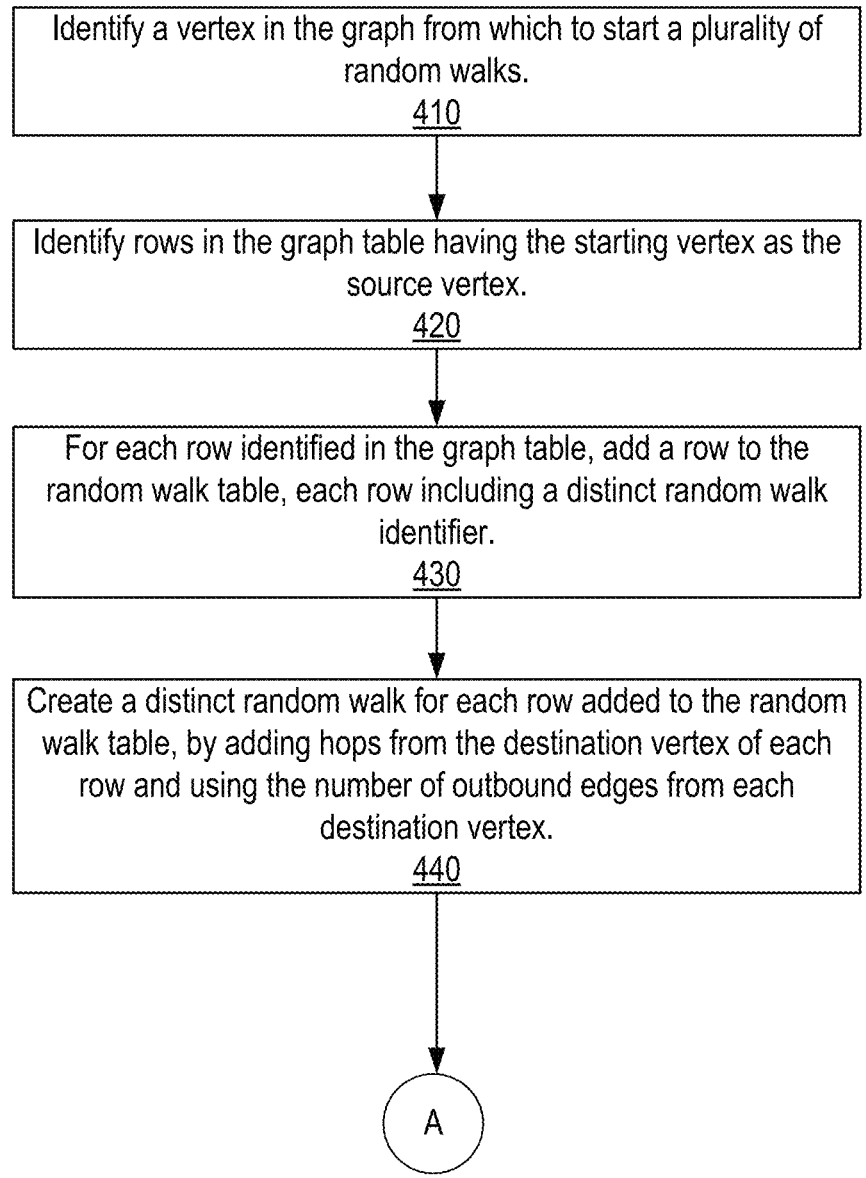

FIGS. 2, 3, and 4 are flow diagrams that illustrate generating one or more random walks through a graph stored in a relational database, in accordance with one or more embodiments. FIG. 2 is a flow diagram for an embodiment in which the starting vertex is pre-selected, and a single random walk is generated from the starting vertex. A relational graph table is created (Operation 210). Each row of the relational graph table includes a (a) source vertex, (b) destination vertex, (c) an identifier that is unique within the set of directed edges beginning at the source vertex, and (d) the number of outbound edges (outdegree) from the destination vertex.

The number of outbound edges from a particular vertex may be determined by identifying and counting the relational graph table rows having a particular source vertex. Each of the relational graph table rows representing one of the identified outbound edges may correspond to a unique sequence number. For example, if the outdegree of a source vertex is 3, then each of the three graph table rows that include the source vertex may correspond to a sequence number of 1, 2, or 3.

In an embodiment, the number of outbound edges and/or the unique identifier may pre-computed and stored outside of the relational graph table. In another embodiment, the number of outbound edges and/or the unique identifier may be computed dynamically only as needed rather than being pre-computed and stored in any table.

A starting vertex for the random walk is selected by one of a number of possible ways. One way for the starting vertex to be determined is to specify the starting vertex in the SQL statements, such as in the example of FIG. 6C (line 614). In another embodiment, input may be solicited from a user to provide a starting vertex at runtime. In another embodiment, a vertex may be selected at random from among the vertices in the graph.

The random walk is generated one hop at a time. The source vertex of the first hop to be determined is identified (Operation 220). .

Next hop selector 143 selects a random number that is mapped to one of the identifiers associated with each of the outbound edges from the source vertex (Operation 230). In an embodiment, the random number may be mapped to an identifier of an outbound edge. The identifier may be a number in a consecutive range of numbers between 1 and the number of outbound edges or between 0 and the number of outbound edges −1, depending on how the identifiers were assigned when creating the graph table. The arrow from Connector A to Operation 230 symbolizes that these operations illustrated in FIG. 2 may be reused in other embodiments of generating random walks such as illustrated in FIGS. 3 and 4.

The next hop selector queries the relational graph table for rows in which (a) the source vertex in the row matches the source vertex of the next hop to be added as identified in Operation 220 and (b) the outbound edge identifier matches the identifier mapped from the selected random number (Operation 240). In this embodiment in which a single random walk is being generated, Operation 240 will identify a single row of the relational graph table. The identified row of the relational graph table is the directed edge that will be added as the next hop in the random walk.

Next hop selector 143 adds a row to the random walk table to represent the next hop (Operation 250). One or more termination criteria are evaluated. (Operation 260). Termination criteria may be specified as policy, such as (a) stopping the random walk when the destination vertex of the last hop has no outbound edges or (b) the number of hops already added to the random walk meets a maximum number of hops. Each termination criterion may itself be a complex boolean expression. If one of the termination criteria is met, then the random walk is complete (Operation 280).

If, in Operation 260, if none of the termination criteria is met, then in an embodiment, the SQL statements may be executed again, this time to generate a random walk starting from the destination vertex of the last hop added to the random walk (Operation 270). The next hop selector assigns the source vertex of the next hop to be the destination vertex of the last added hop. Next, the flow returns to Operation 230 where the next hop is selected from the source vertex.

If more than one random walks are to be generated, the set of operations illustrated in FIG. 2 may be performed sequentially for each random walk starting at Operation 220 (the graph table only needs to be created once).

FIG. 3 is a flow diagram that illustrates a set of operations for generating multiple random walks through a graph stored in a relational database, in accordance with one or more embodiments. As in the flow of FIG. 2, a relational graph table is constructed. Each row of the graph table includes a source vertex, destination vertex, unique outbound edge identifier, and the number of outbound edges from the destination vertex (Operation 310). Unlike the flow illustrated in FIG. 2, the flow of FIG. 3 starts by selecting multiple vertices, each selected vertex starts a distinct random walk. The multiple starting vertices may be received as input or the multiple starting vertices may be randomly selected from the entire set of graph vertices (Operation 320).

The operations of FIG. 3 sequentially iterate through the set of starting vertices. In this embodiment, the entire random walk for one starting vertex may be generated before starting to generate another random walk starting at another starting vertex. If there is at least one vertex remaining in the set of identified starting vertices (Operation 330), then one of the remaining starting vertices is selected (Operation 340, and the flow proceeds to symbol A in FIG. 2. After the random walk starting from the selected vertex is completed, if there is at least one more vertex left in the set of starting vertices (Operation 330), then a new vertex is selected (Operation 340) and the flow repeats. If there are no more vertices left, (Operation 330) then the flow terminates in Operation 350.

FIG. 4 is a flow diagram that illustrates generating multiple random walks through a graph stored in a relational database, in accordance with one or more embodiments. The flow of FIG. 4 uses an existing relational graph table such as constructed in Operation 310 in the flow of FIG. 3. One vertex from the graph is selected as the origin (starting vertex) for all random walks generated by this flow. The origin vertex may be provided as input or selected randomly from the vertices in the graph (Operation 410). The graph table is searched to identify rows having a source vertex that matches the selected origin for random walks. In other words, rows representing all outbound edges starting with the selected origin vertex are identified. (Operation 420). Each identified row may represent a first hop in a distinct random walk, and a corresponding row may be added to the random walk table having a distinct random walk identifier (Operation 430). For each first hop of a distinct random walk, remaining hops are selected starting from the destination vertex of each first hop (Operation 440). For each distinct random walk, the destination vertex of the first hop and the number of outbound edges from the destination vertex are used as input into generating the rest of the random walk as represented by connector A into the operations of FIG. 2.

5. EXAMPLES

Figures 5A, 5B:
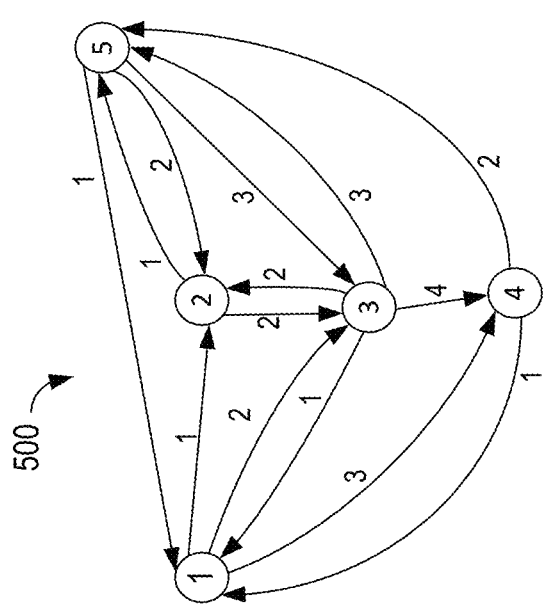
FIG. 5A illustrates an example graph, in accordance with one or more embodiments.
FIG. 5B is a diagram that illustrates an augmented graph table corresponding to the example graph illustrated in FIG. 5A, in accordance with one or more embodiments.

FIG. 5A illustrates an example graph, in accordance with one or more embodiments, and FIG. 5B is a diagram that illustrates an augmented graph table that represents the graph illustrated in FIG. 5A, in accordance with one or more embodiments. Graph 500 includes 5 vertices and 14 outbound edges. Each of the outbound edges from vertex 1 (1->2, 1->3, and 1->4) is labelled with a distinct number (1, 2 and 3, respectively). Vertex 2 has 2 outbound edges (2->5, 2->3) labelled 1 and 2 respectively. All the vertices in graph 500 have outbound edges. Every vertex can be a starting vertex, and there is no vertex that may terminate a random walk due to a lack of outbound edges.

Augmented graph table 550 illustrates a graph table representation for graph 500. The row number column was added for purposes of explanation herein. The graph table may or may not include a column that stores a row number. Rows 1, 2, and 3 of the augmented graph table represent the three outbound edges starting from vertex 1. Row 1 represents the edge starting from source vertex 1 and ending at destination vertex 2 (1->2) which is labelled 1 (also referred to as the DVID_RANK). DVID_OUTDEG is the number of outbound edges for the destination vertex. The destination vertex 2 has 2 outbound edges. As another example, row 11 of the graph table represents the edge starting from vertex 4 and ending at destination vertex 5 (4->5). The edge from 4 to 5 is labelled 2 as seen in the DVID_RANK column, and the number of outbound edges from vertex 5 is 3.

In an embodiment, the augmented graph table may be created by extracting a set of outbound edges from a graph representation. That is, the augmented graph table may start with two columns: source vertex (SVID) and destination vertex (DVID). For each vertex in the graph, the number of rows in which the vertex appears as a source vertex is counted. That number is the out degree of the vertex. The DVID_OUTDEG column of each row of the augmented graph table is populated by the out degree of the destination vertex in each row. In addition, each of the rows having the same source vertex may be assigned a distinct identifier stored in the DVID_RANK column of the row.

Figures 6A, 6B:
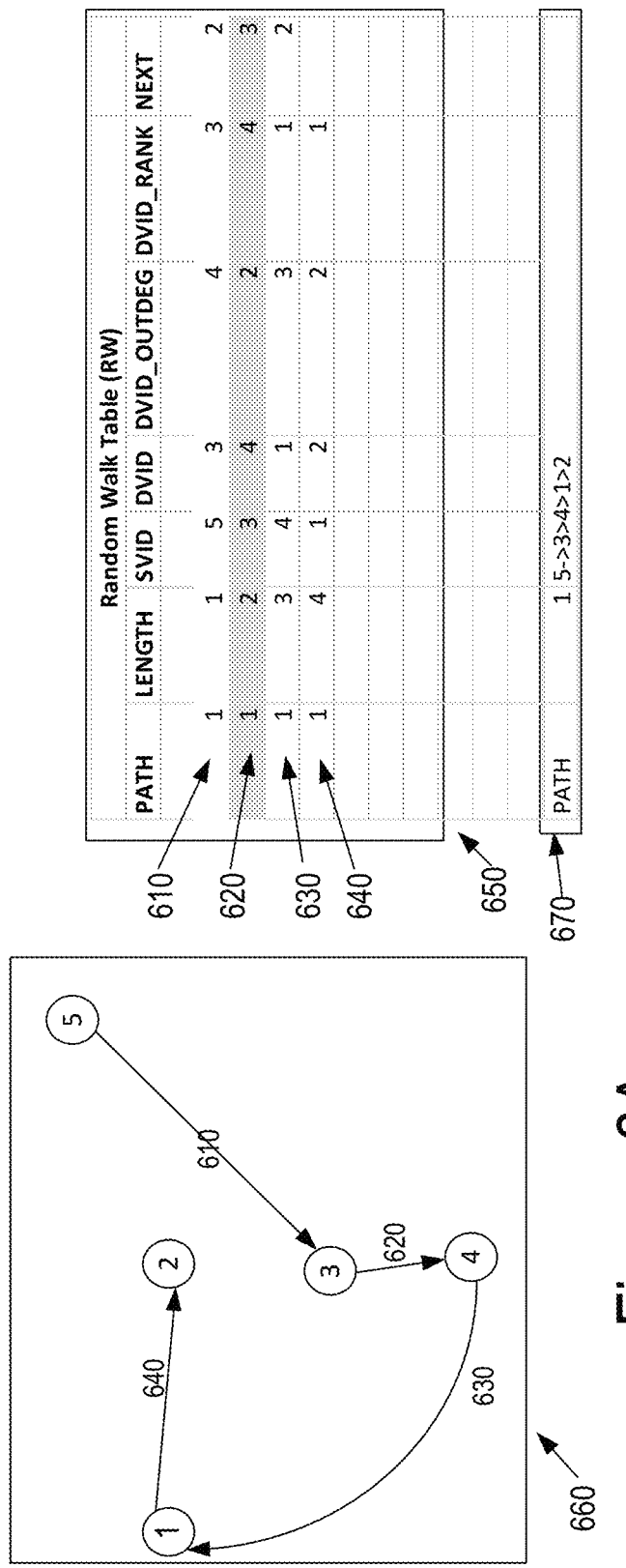
FIG. 6A illustrates a particular random walk through a graph, in accordance with one or more embodiments.
FIG. 6B is a diagram that illustrates a random walk table representing the example random walk illustrated in FIG. 6A, in accordance with one or more embodiments.

FIG. 6A illustrates a Graph 660 that represents a particular random walk through graph 500, in accordance with one or more embodiments. In this example, the random walk of graph 660 includes all of the vertices of graph 500 but only includes a subset of directed edges. The random walk of graph 660 starts at vertex 5. Directed edge 610 is the first hop in the random walk from vertex 5 to vertex 3 (5->3). From vertex 3, the next hop is edge 620 leading to vertex 4 (5->3->4). From vertex 4, the next hop takes edge 630 to vertex 1 (5->3->4->1) and the last hop takes edge 640 from vertex 1 to vertex 2 ((5->3->4->1->2).

FIG. 6B is a diagram that illustrates an example random walk table representing the example random walk illustrated in FIG. 6A, in accordance with one or more embodiments. Each row in the random walk table is depicted with reference numbers that identify corresponding edges in the graph of FIG. 6A. For example, the highlighted random walk table row is annotated with reference number 620 to indicate that the highlighted row corresponds to the hop 3->4 in the random walk. As there is only one random walk illustrated, the path identifier in the random walk table is 1 for all rows. In this example, vertex 5 was selected as the starting vertex having 3 outbound edges. A random number is mapped to one of the 3 outbound edges. In this example, the third outbound edge from vertex 5 was selected, which is the edge from 5 to 3 (610). The random walk table row representing the edge from vertex 5 to vertex 3 (5->3) indicates that the source vertex is 5, the destination vertex is 3, the length of 1indicates that 5>3 is the first hop in the random walk. The row in the walk table also stores the outdegree of vertex 3, which is 4.

The next hop starts with vertex 3 having 4 outbound edges. In this example, a random number was generated and mapped to the fourth outbound edge starting from vertex 3, which is edge 620 to vertex 4. The outdegree of vertex 4 is 2. Row 620 of the random walk table thus includes a length of 2 (second hop of the walk), source vertex 3, destination vertex 4, outdegree 2, and the rank of the edge selected for this hop is 4. The random walk now includes (5->3->4)

The next hop starts with vertex 4 having 2 outbound edges. In this example, a random number was generated and mapped to the first ranked edge starting from vertex 4, which is edge 630 to vertex 1. Vertex 1 has 3 outbound edges. Row 630 of the random walk table thus includes a length of 3 (third hop of the walk), source vertex 4, destination vertex 1, outdegree 3, and the rank of the edge selected for this hop is 1. The random walk now includes (5->3->4->1).

The final hop starts with vertex 1 having 3 outbound edges. In this example, a random number was generated and mapped to the first ranked edge starting from vertex 1, which is edge 640 to vertex 2. Vertex 2 has 2 outbound edges. Row 640 of the random walk table thus includes a length of 4 (fourth hop of the walk), source vertex 1, destination vertex 2, outdegree 2, and the rank of the edge selected for this hop is 1. The random walk now includes (5->3->4->1->2).

FIG. 6C illustrates example SQL statements for generating a random walk table representing one or more random walks through a graph, in accordance with one or more embodiments. This example SQL generates a single random walk through the graph starting at a vertex identified in the SQL statements (line 614). In line 605, the "WITH" keyword indicates that these statements comprise a recursive query, also known as Recursive Common Table Expression (CTE). In line 614, the starting vertex is 5 and the rank is 1, which selects a single row of the augmented graph table having a source vertex 5 and a rank of 1. This row will be the basis for the first hop in the random walk. In lines 605, 608, and 611, a row is added to the random walk table with columns represented by variables that are assigned values as follows: length is assigned to 1, meaning that the length of the random walk is 1 as of this row. SVID is assigned to 5. DVID is assigned the value determined in line 626, which is the destination vertex extracted from the graph table row identified above. The DVID_OUTDEG and DVID_RANK are assigned the values from the DVID_OUTDEG and DVID_RANK columns of the graph table row, respectively. The NEXT variable (stored in the NEXT column of the random walk table) represents the identifier of the outbound edge from the destination vertex in preparation for determining the next hop. NEXT is assigned the result from line 611 that generates a random number and maps the randomly generated number to a number between 1 and the DVID_OUTDEG.

In line 617, another row is added to the random walk table representing the second hop in the random walk. The second hop corresponds to the graph table row having the previous destination vertex as the source vertex and the value of NEXT as the identifier in the DVID_RANK column. The length is incremented by 1. This random walk table row will be the second hop (length=2). As described for creating the first row of the random walk table, values for destination vertex, DVID_RANK, and DVID_OUTDEG in the random walk table are taken from the row of the graph table. A new NEXT value is assigned if the length is less than 10. The policy for this algorithm is that the maximum length of the random walk is 10 hops.

In line 623, the SQL query is invoked recursively. Lines 617, 620, 623, and 626 are repeated until the maximum number of hops is reached.

Lines 629 and 632 print out the sequence of vertices that define the random walk. The random walk table rows having the same path value are ordered by their length column, and the source vertex from each row in order is output followed by "->" if the vertex is not the last vertex in the walk.

Additional examples of using a recursive SQL query for generating random walks for different policies may be found in Appendix B.

OTHER EMBODIMENTS

The example SQL query discussed above for FIG. 6C uses recursive SQL. That is, SQL itself supports the recursive construct. However, there are other ways to use SQL statements to perform the same set of operations illustrated in FIGS. 2, 3, and 4. In one embodiment, PL/SQL may be used to define a loop which iteratively generates each random walk, or a loop that for a particular random walks iteratively adds hops. Additionally or alternatively, the PL/SQL statements may define a function that can be called recursively, without using recursion support in the SQL language.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is labeled with a tenant ID. A tenant is permitted access to a particular network resource only if the tenant and the particular network resources are associated with a same tenant ID.

In an embodiment, each tenant is associated with a tenant ID. Each application, implemented by the computer network, is labeled with a tenant ID. Additionally or alternatively, each data structure and/or dataset, stored by the computer network, is labeled with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be labeled with a tenant ID. Only a tenant associated with the corresponding tenant ID may access data of a particular database. As another example, each entry in a database implemented by a multi-tenant computer network may be labeled with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
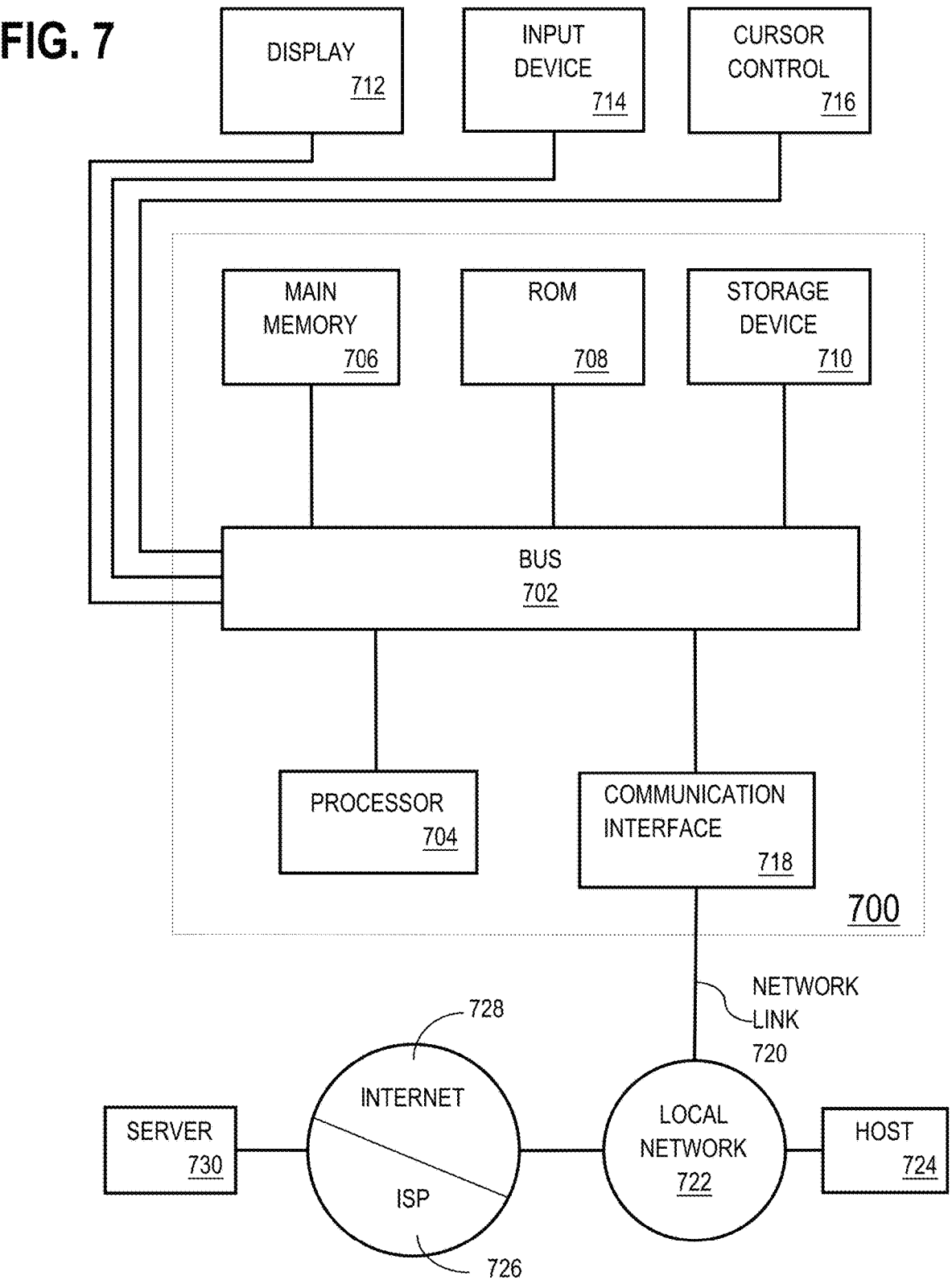
FIG. 7 shows a block diagram that illustrates a computer system, in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating a random walk through a graph, the method comprising:
   creating a graph table in a relational database comprising one or more rows, each row of the one or more rows representing a directed edge in the graph;
   storing in each row of the graph table:
   a source vertex and a destination vertex of a directed edge in the graph that is represented by the row;
   a number of outbound edges starting from the destination vertex;
   identifying a first vertex in the graph as the starting vertex for the random walk;
   determining a first number of outbound edges from the starting vertex;
   executing one or more SQL statements on the graph table for adding rows to a random walk table in the relational database, each row of the graph table representing a directed edge selected for inclusion in the random walk, wherein executing the one or more SQL statements comprises:
   randomly selecting a number from a range of numbers, wherein the first number of outbound edges from the starting vertex is the size of the range of numbers;
   selecting a particular graph table row in which the source vertex matches the starting vertex and corresponds to the randomly selected number;
   selecting the destination vertex in the particular graph table row as a second vertex;
   adding a new row to the random walk table representing a hop in the random walk from the starting vertex to the second vertex;
   retrieving from the particular graph table row a second number of outbound edges from the second vertex; and
   executing the one or more SQL statements to add a hop to the random walk using the second vertex as the starting vertex and the second number of outbound edges from the second vertex as the first number of outbound edges from the starting vertex;
   presenting the random walk as a sequence of vertices by iterating through the rows of the random walk table in order and adding the vertex stored in each row to the sequence of vertices in the random walk.

2. The method of claim 1, wherein:
   each row of the graph table further stores a unique sequence number of the directed edge within a set of directed edges beginning at the source vertex, wherein the unique sequence number is a number between 1 and the number of directed edges beginning at the source vertex.

3. The method of claim 2, wherein selecting a particular graph table row further comprises determining that the randomly selected number matches the unique sequence number stored in the particular graph table row.

4. The method of claim 1, wherein the one or more SQL statements comprise a recursive SQL query.

5. The method of claim 1, further comprising:
   identifying a maximum length for the random walk; and
   wherein executing the one or more SQL statements to add a hop to the random walk is performed in response to determining that the number of hops in the random walk is less than the maximum length for the random walk.

6. The method of claim 1, the method further comprising:
   after adding a particular hop to the random walk, the particular hop having a first source vertex and a first destination vertex, executing the one or more SQL statements to add a subsequent hop to the random walk responsive to determining that there is at least one outbound edge from the first destination vertex.

7. The method of claim 1, wherein the random walk through the graph is a first random walk; and
   the method further comprising:
   selecting a third vertex in the graph as a second starting vertex;
   generating a second random walk starting at the second starting vertex;
   wherein each row in the random walk table further includes a random walk identifier that indicates which of a plurality of random walks includes the hop represented by the row;

wherein presenting the first random walk further comprises selecting rows of the random walk table in which the random walk identifier identifies the first random walk; and presenting the second random walk by iterating through the rows of the random walk table in which the random walk identifier identifies the second random walk.

8. The method of claim 1, wherein the random walk is a first random walk starting at the first vertex; the method further comprising:

generating a second random walk through the graph by:
selecting a second graph table row in which (a) the source vertex matches the first vertex and (b) the second graph table row represents a second directed edge that is not the first hop in the first random walk;
adding a row to the random walk table in the relational database that represents the second directed edge selected for inclusion in the second random walk;
adding rows to the random walk table in the relational database by executing the one or more SQL statements on the graph table using the destination vertex of the second graph table row as the starting vertex and a third number of outbound edges from the destination vertex as the first number of outbound edges from the starting vertex;
wherein each row added to the graph table includes a random walk identifier that identifies the row as representing a hop in the second random walk;
presenting the second random walk as a sequence of vertices by iterating through the rows of the random walk table that represent hops in the second random walk and adding the vertex stored in each row to the sequence of vertices in the random walk.

9. The method of claim 1, wherein each row of the random walk table further includes a sequence value that indicates the order in which the rows were added to the table; and
presenting the random walk further comprises iterating through the rows of the random walk table in sequence order.

10. The method of claim 1, wherein identifying the starting vertex comprises receiving the starting vertex as input.

11. The method of claim 1, wherein identifying the starting vertex comprises randomly selecting a vertex from a set of vertices in the graph.

12. One or more non-transitory machine-readable media storing instructions for generating a random walk through a graph which, when executed by one or more hardware processors, causes performance of operations comprising:

creating a graph table in a relational database comprising one or more rows, each row of the one or more rows representing a directed edge in the graph;
storing in each row of the graph table:
a source vertex and a destination vertex of a directed edge in the graph that is represented by the row;
a number of outbound edges starting from the destination vertex;
identifying a first vertex in the graph as the starting vertex for the random walk;
determining a first number of outbound edges from the starting vertex;
executing one or more SQL statements on the graph table for adding rows to a random walk table in the relational database, each row of the graph table representing a directed edge selected for inclusion in the random walk, wherein executing the one or more SQL statements comprises:

randomly selecting a number from a range of numbers, wherein the first number of outbound edges from the starting vertex is the size of the range of numbers;
selecting a particular graph table row in which the source vertex matches the starting vertex and corresponds to the randomly selected number;
selecting the destination vertex in the particular graph table row as a second vertex;
adding a new row to the random walk table representing a hop in the random walk from the starting vertex to the second vertex;
retrieving from the particular graph table row a second number of outbound edges from the second vertex; and
executing the one or more SQL statements to add a hop to the random walk using the second vertex as the starting vertex and the second number of outbound edges from the second vertex as the first number of outbound edges from the starting vertex;
presenting the random walk as a sequence of vertices by iterating through the rows of the random walk table in order and adding the vertex stored in each row to the sequence of vertices in the random walk.

13. The media of claim 12, the media further storing instructions that cause performance of operations comprising:

after adding a particular hop to the random walk, the particular hop having a first source vertex and a first destination vertex, executing the one or more SQL statements to add a subsequent hop to the random walk responsive to determining that there is at least one outbound edge from the first destination vertex.

14. The media of claim 12, wherein the random walk through the graph is a first random walk starting at a first starting vertex; and
further storing instructions that cause performance of operations comprising:
selecting a third vertex in the graph as a second starting vertex;
generating a second random walk starting at the second starting vertex;
wherein each row in the random walk table further includes a random walk identifier that indicates which of a plurality of random walks includes the hop represented by the row;
wherein presenting the first random walk further comprises selecting rows of the random walk table in which the random walk identifier identifies the first random walk; and
presenting the second random walk by iterating through the rows of the random walk table in which the random walk identifier identifies the second random walk.

15. The media of claim 12, wherein the random walk is a first random walk starting at the first vertex; and further storing instructions that cause performance of operations comprising:
generating a second random walk through the graph by:
selecting a second graph table row in which (a) the source vertex matches the first vertex and (b) the second graph table row represents a second directed edge that is not the first hop in the first random walk;

adding a row to the random walk table in the relational database that represents the second directed edge selected for inclusion in the second random walk;

adding rows to the random walk table in the relational database by executing the one or more SQL statements on the graph table using the destination vertex of the second graph table row as the starting vertex and a third number of outbound edges from the destination vertex as the first number of outbound edges from the starting vertex;

wherein each row added to the graph table includes a random walk identifier that identifies the row as representing a hop in the second random walk;

presenting the second random walk as a sequence of vertices by iterating through the rows of the random walk table that represent hops in the second random walk and adding the vertex stored in each row to the sequence of vertices in the random walk.

16. The media of claim 12, wherein each row of the random walk table further includes a sequence value that indicates the order in which the rows were added to the table; and presenting the random walk further comprises iterating through the rows of the random walk table in sequence order.

17. The media of claim 12, wherein identifying the starting vertex comprises receiving the starting vertex as input.

18. The media of claim 12, wherein identifying the starting vertex comprises randomly selecting a vertex from a set of vertices in the graph.

19. One or more non-transitory machine-readable media storing instructions for generating a random walk through a graph which, when executed by one or more hardware processors, causes performance of operations comprising:

creating a graph table in a relational database comprising one or more rows, each row of the one or more rows representing a directed edge in the graph;

storing in each row of the graph table:
  a source vertex and a destination vertex of a directed edge in the graph that is represented by the row;
  a unique sequence number of the directed edge within a set of directed edges beginning at the source vertex, wherein the unique sequence number is a number between 1 and the number of directed edges beginning at the source vertex;

identifying a first vertex in the graph as the starting vertex for the random walk;

determining a first number of outbound edges from the starting vertex;

executing one or more SQL statements on the graph table for adding rows to a random walk table in the relational database, each row of the graph table representing a directed edge selected for inclusion in the random walk, wherein executing the one or more SQL statements comprises:
  randomly selecting a number from a range of numbers, wherein the first number of outbound edges from the starting vertex is the size of the range of numbers;
  selecting a particular graph table row in which the source vertex matches the starting vertex and corresponds to the randomly selected number;
  selecting the destination vertex in the particular graph table row as a second vertex;
  adding a new row to the random walk table representing a hop in the random walk from the starting vertex to the second vertex;
  retrieving from the particular graph table row a second number of outbound edges from the second vertex; and
  executing the one or more SQL statements to add a hop to the random walk using the second vertex as the starting vertex and the second number of outbound edges from the second vertex as the first number of outbound edges from the starting vertex;

presenting the random walk as a sequence of vertices by iterating through the rows of the random walk table in order and adding the vertex stored in each row to the sequence of vertices in the random walk.

20. One or more non-transitory machine-readable media storing instructions for generating a random walk through a graph which, when executed by one or more hardware processors, causes performance of operations comprising:

creating a graph table in a relational database comprising one or more rows, each row of the one or more rows representing a directed edge in the graph;

storing in each row of the graph table:
  a source vertex and a destination vertex of a directed edge in the graph that is represented by the row;
  a unique sequence number of the directed edge within a set of directed edges beginning at the source vertex, wherein the unique sequence number is a number between 1 and the number of directed edges beginning at the source vertex;

identifying a first vertex in the graph as the starting vertex for the random walk;

determining a first number of outbound edges from the starting vertex;

executing one or more SQL statements on the graph table for adding rows to a random walk table in the relational database, each row of the graph table representing a directed edge selected for inclusion in the random walk, wherein executing the one or more SQL statements comprises:
  randomly selecting a number from a range of numbers, wherein the first number of outbound edges from the starting vertex is the size of the range of numbers;
  selecting a particular graph table row in which the source vertex matches the starting vertex and corresponds to the randomly selected number, wherein selecting a particular graph table row further comprises determining that the randomly selected number matches the unique sequence number stored in the particular graph table row;
  selecting the destination vertex in the particular graph table row as a second vertex;
  adding a new row to the random walk table representing a hop in the random walk from the starting vertex to the second vertex;
  retrieving from the particular graph table row a second number of outbound edges from the second vertex; and
  executing the one or more SQL statements to add a hop to the random walk using the second vertex as the starting vertex and the second number of outbound edges from the second vertex as the first number of outbound edges from the starting vertex;

presenting the random walk as a sequence of vertices by iterating through the rows of the random walk table in order and adding the vertex stored in each row to the sequence of vertices in the random walk.

21. One or more non-transitory machine-readable media storing instructions for generating a random walk through a graph which, when executed by one or more hardware processors, causes performance of operations comprising:
creating a graph table in a relational database comprising one or more rows, each row of the one or more rows representing a directed edge in the graph;
storing in each row of the graph table:
a source vertex and a destination vertex of a directed edge in the graph that is represented by the row;
identifying a first vertex in the graph as the starting vertex for the random walk;
determining a first number of outbound edges from the starting vertex;
executing one or more SQL statements on the graph table for adding rows to a random walk table in the relational database, each row of the graph table representing a directed edge selected for inclusion in the random walk, wherein executing the one or more SQL statements comprises:
randomly selecting a number from a range of numbers, wherein the first number of outbound edges from the starting vertex is the size of the range of numbers;
selecting a particular graph table row in which the source vertex matches the starting vertex and corresponds to the randomly selected number;
selecting the destination vertex in the particular graph table row as a second vertex;
adding a new row to the random walk table representing a hop in the random walk from the starting vertex to the second vertex;
retrieving from the particular graph table row a second number of outbound edges from the second vertex; and
executing the one or more SQL statements to add a hop to the random walk using the second vertex as the starting vertex and the second number of outbound edges from the second vertex as the first number of outbound edges from the starting vertex;
presenting the random walk as a sequence of vertices by iterating through the rows of the random walk table in order and adding the vertex stored in each row to the sequence of vertices in the random walk,
wherein the one or more SQL statements comprise a recursive SQL query.

22. One or more non-transitory machine-readable media storing instructions for generating a random walk through a graph which, when executed by one or more hardware processors, causes performance of operations comprising:
creating a graph table in a relational database comprising one or more rows, each row of the one or more rows representing a directed edge in the graph;
storing in each row of the graph table:
a source vertex and a destination vertex of a directed edge in the graph that is represented by the row;
identifying a first vertex in the graph as the starting vertex for the random walk;
determining a first number of outbound edges from the starting vertex;
executing one or more SQL statements on the graph table for adding rows to a random walk table in the relational database, each row of the graph table representing a directed edge selected for inclusion in the random walk, wherein executing the one or more SQL statements comprises:
randomly selecting a number from a range of numbers, wherein the first number of outbound edges from the starting vertex is the size of the range of numbers;
selecting a particular graph table row in which the source vertex matches the starting vertex and corresponds to the randomly selected number;
selecting the destination vertex in the particular graph table row as a second vertex;
adding a new row to the random walk table representing a hop in the random walk from the starting vertex to the second vertex;
retrieving from the particular graph table row a second number of outbound edges from the second vertex;
identifying a maximum length for the random walk; and
executing the one or more SQL statements to add a hop to the random walk using the second vertex as the starting vertex and the second number of outbound edges from the second vertex as the first number of outbound edges from the starting vertex;
wherein executing the one or more SQL statements to add a hop to the random walk is performed in response to determining that the number of hops in the random walk is less than the maximum length for the random walk;
presenting the random walk as a sequence of vertices by iterating through the rows of the random walk table in order and adding the vertex stored in each row to the sequence of vertices in the random walk.

23. One or more non-transitory machine-readable media storing instructions which, when executed by one or more hardware processors, causes performance of operations comprising:
identifying a relational table representing at least a portion of a graph;
wherein a first row in the relational table comprises:
a first value corresponding to a first vertex in the graph;
a second value corresponding to a second vertex that is connected to a first outbound edge of a first number of outbound edges in the graph from the first vertex;
a third value comprising a first unique identifier of the first outbound edge beginning at the first vertex, wherein the first unique identifier is a number between 1 and the first number of outbound edges beginning at the first vertex;
a fourth value corresponding to a number of outbound edges from the second vertex to other vertices in the graph;
wherein a second row in the relational table comprises:
the first value corresponding to the first vertex in the graph;
a fifth value corresponding to a third vertex that is connected to a second outbound edge of the first vertex in the graph;
a sixth value comprising a second unique identifier of the second outbound edge beginning at the first vertex, wherein the second unique identifier is a number between 1 and the first number of outbound edges beginning at the first vertex; and a seventh value corresponding to a number of outbound edges from the third vertex to other vertices in the graph;

using the relational table to determine a next hop from the first vertex in a path through the graph at least by:
  randomly selecting a number from 1 to the first number of outbound edges in the graph from the first vertex;
  responsive to (a) the randomly selected number matching (b) the third value in the first row:
    selecting the first row for determining the next hop from the first vertex;
    determining that the second value in the first row is the second vertex; and
    selecting the second vertex as the next hop from the first vertex in the path through the graph.

24. A system comprising:
at least one device including a hardware processor;
the system configured to perform steps comprising:
generating a random walk through a graph, the steps comprising:
  creating a graph table in a relational database comprising one or more rows, each row of the one or more rows representing a directed edge in the graph;
  storing in each row of the graph table:
    a source vertex and a destination vertex of a directed edge in the graph that is represented by the row;
    a number of outbound edges starting from the destination vertex;
  identifying a first vertex in the graph as the starting vertex for the random walk;
  determining a first number of outbound edges from the starting vertex;
  executing one or more SQL statements on the graph table for adding rows to a random walk table in the relational database, each row of the graph table representing a directed edge selected for inclusion in the random walk, wherein executing the one or more SQL statements comprises:
    randomly selecting a number from a range of numbers, wherein the first number of outbound edges from the starting vertex is the size of the range of numbers;
    selecting a particular graph table row in which the source vertex matches the starting vertex and corresponds to the randomly selected number;
    selecting the destination vertex in the particular graph table row as a second vertex;
    adding a new row to the random walk table representing a hop in the random walk from the starting vertex to the second vertex;
    retrieving from the particular graph table row a second number of outbound edges from the second vertex; and
    executing the one or more SQL statements to add a hop to the random walk using the second vertex as the starting vertex and the second number of outbound edges from the second vertex as the first number of outbound edges from the starting vertex;
  presenting the random walk as a sequence of vertices by iterating through the rows of the random walk table in order and adding the vertex stored in each row to the sequence of vertices in the random walk.

* * * * *

UNITED STATES PATENT AND TRADEMARK OFFICE
CERTIFICATE OF CORRECTION

PATENT NO. : 11,334,567 B2
APPLICATION NO. : 16/543258
DATED : May 17, 2022
INVENTOR(S) : Ziauddin et al.

Page 1 of 1

It is certified that error appears in the above-identified patent and that said Letters Patent is hereby corrected as shown below:

In the Drawings

On sheet 3 of 8, in FIGURE 3, under Reference Numeral 330, Line 1, delete "verticies" and insert -- vertices --, therefor.

On sheet 3 of 8, in FIGURE 3, under Reference Numeral 330, Line 2, delete "verticies" and insert -- vertices --, therefor.

In the Specification

In Column 6, Line 23, delete "220).." and insert -- 220). --, therefor.

In Column 7, Line 24, delete "340," and insert -- 340), --, therefor.

In Column 8, Line 59, delete "lindicates" and insert -- 1 indicates --, therefor.

In Column 9, Line 2, delete "(5->3->4)" and insert -- (5->3->4). --, therefor.

In Column 10, Line 11, delete "3,and" and insert -- 3, and --, therefor.

Signed and Sealed this
Eighth Day of November, 2022

Katherine Kelly Vidal
*Director of the United States Patent and Trademark Office*